J. P. SCUDDER.
Potato Digger.
No. 30,253.
Patented Oct. 2, 1860.
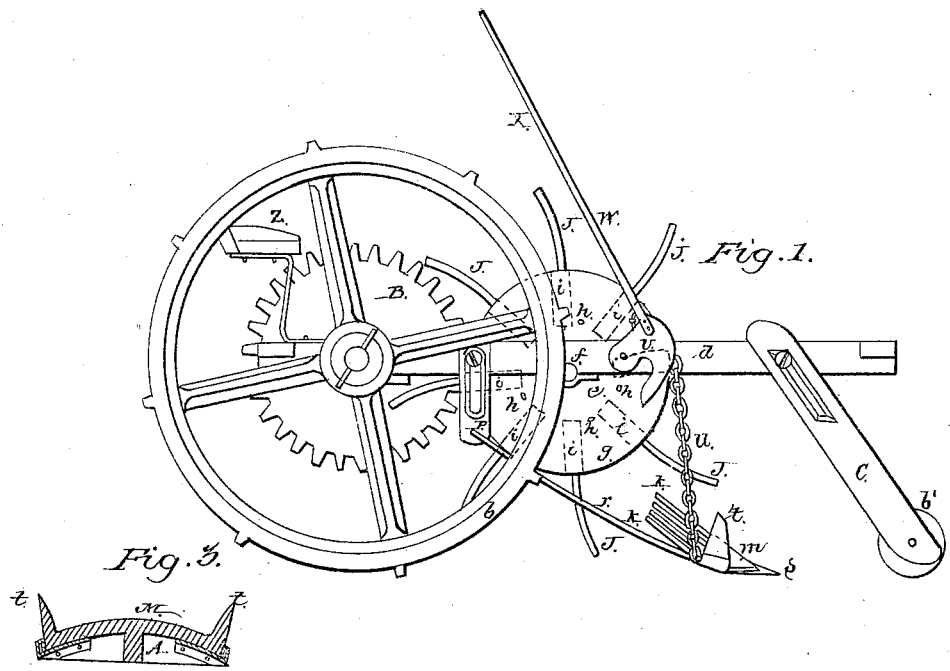
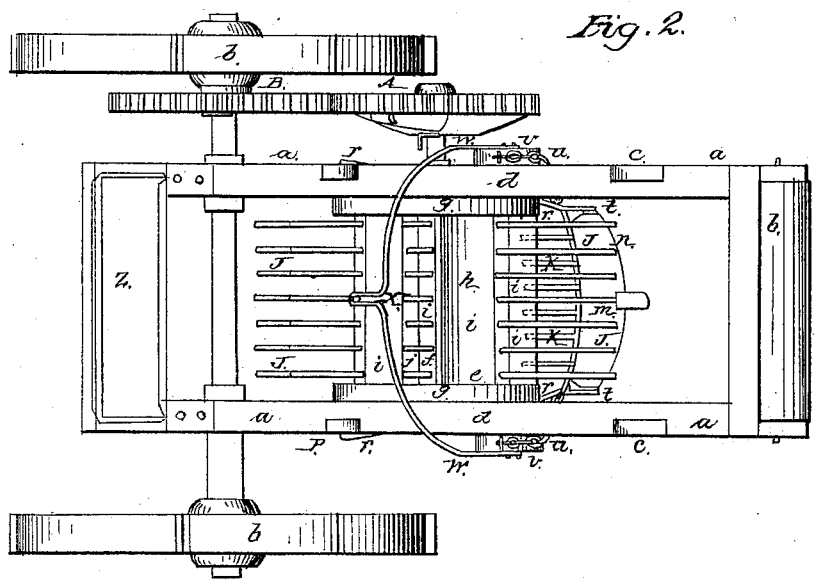
Witnesses:
Inventor:
John P. Scudder

UNITED STATES PATENT OFFICE.

JOHN P. SCUDDER, OF HIGHTSTOWN, NEW JERSEY.

IMPROVEMENT IN POTATO-DIGGERS.

Specification forming part of Letters Patent No. 30,253, dated October 2, 1860.

*To all whom it may concern:*

Be it known that I, JOHN P. SCUDDER, of Hightstown, in the county of Mercer and State of New Jersey, have invented an Improvement in Potato-Diggers; and I do hereby declare that the following is a full, clear, and exact description of the principle or character which distinguishes it from all other things before known, and of the usual manner of making, modifying, and using the same, reference being had to the accompanying drawings, of which—

Figure 1 is a side elevation of the machine; Fig. 2, a top view of the same; Fig. 3, a cross-section of the digger or plow.

My invention consists in an improvement in potato-diggers, described as follows:

$a$ is a carriage-frame, mounted upon two driving-wheels, $b$, and supported in front upon a gage-roller, $b'$, which turns in the lower ends of the adjustable arms $c\ c$. Between the side bars, $d$, of this frame an elevator and cleaner, $e$, is made to turn upon axis $f$. This elevator is constructed as follows: At each side of the machine, between the frame-bars, I fix a disk or head, $g$, upon axis $f$, and between these heads or plates are fixed radial pieces or partitions $i$. As these partitions do not extend to the axis, there is a space open between their inner ends, and across this space is stretched a wire, $h$, which still leaves the space open on either side of the wire between it and the partitions. The partitions and wire thus form a chamber with a bottom sufficiently open to allow objects smaller than potatoes to fall through. Upon the outer end of the partitions are projecting parallel wires or fingers $j$, which are slightly curved toward the back of the machine. These fingers pass between fingers $k$ on the back of the digger $m$, which is described as follows:

$n$ is a broad shovel of curved form, as shown in the section in Fig. 3, hung to the adjustable drop-pieces $p$ by rods $r$. The ends of the rods are bent at right angles and turn in suitable bearings in the drop-pieces, so that the shovel may be raised and lowered, while the pitch of the shovel may be altered by adjusting the drop-pieces. The shovel is provided with an opening-point, $s$, and on either side with wings $t$. The digger is raised and lowered by means of the chains $u$, which pass over the periphery of cams $v$, and these are operated by handles $w$, which unite together at $x$ and are managed by the driver from his seat $z$.

The operation is as follows: The elevator is turned by means of gear A and gear B on the shaft of the driving-wheel. The point of the shovel or plow of the digger entering the middle of the potato row, the potatoes and earth are lifted upon the shovel and pass backward, being confined on the sides by wings $t$. When they arrive at the fingers $k$ the earth falls through the fingers, and the potatoes are lifted by the fingers $j$ and carried upward, all the while the potatoes moving and cleaning themselves, and when fingers $j$ come to nearly a vertical position the potatoes roll down into the open-bottom chambers of the elevator and the remaining dirt and rubbish fall through the open bottoms, and as the elevator continues to revolve the potatoes are delivered in the rear of the elevator into suitable troughs or receptacles. (Not shown here.)

The open-bottom chambers are of great utility in cleaning the potatoes, and the open fingers of the elevator passing through the open fingers in the rear of the digger enables me to raise, lower, and alter the position of the digger without interfering with mutual and respective functions of the elevator and digger.

I claim—

Constructing the elevator with a series of open or grated bottom radial chambers, and corresponding series of open curved fingers, $j$, which are caused to pass through a series of open fingers, $k$, upon the digger, as set forth.

JOHN P. SCUDDER.

Witnesses:
J. H. JOHNSTON,
SAMUEL KILLEY.